United States Patent

Chen et al.

[11] Patent Number: 6,068,090
[45] Date of Patent: May 30, 2000

[54] BRAKING DEVICE FOR A BICYCLE

[76] Inventors: Jack Chen; Robert Chang, both of No. 19, Fengchou Rd., Shenkang Township, Taichung Country, Taiwan

[21] Appl. No.: 09/345,514

[22] Filed: Jul. 1, 1999

[51] Int. Cl.[7] .................................................. B62L 3/00
[52] U.S. Cl. ..................................... 188/24.22; 188/24.11; 188/250 B
[58] Field of Search ............................. 188/250 B, 250 R, 188/250 F, 250 G, 24.11, 24.12, 24.22

[56] References Cited

U.S. PATENT DOCUMENTS

| 3,840,093 | 10/1974 | Hamayasu | 188/250 B |
| 5,259,483 | 11/1993 | Pelfrey | 188/24.22 |
| 5,503,253 | 4/1996 | Li | 188/24.12 |

FOREIGN PATENT DOCUMENTS 3900087  2/1990  Denmark ........................... 188/250 B

*Primary Examiner*—Robert J. Oberleitner
*Assistant Examiner*—Devon Kramer
*Attorney, Agent, or Firm*—Rosenberg, Klein & Lee

[57] ABSTRACT

A brake device for a bicycle includes a mounting seat having a space and an opening that faces a bicycle wheel. A resilient member is mounted in the space. A brake piece is mounted in front of the space for braking the bicycle wheel. The brake piece is connected to the resilient member to move therewith. A connecting member includes a first end operably connected to the resilient member and a second end actuatable by a brake lever for urging the resilient member and the brake piece to brake the bicycle wheel.

4 Claims, 4 Drawing Sheets

BRAKING DEVICE FOR A BICYCLE

BACKGROUND OF THE INVENTION

1. Field of the Invention

The present invention relates to a braking device for a bicycle that provides reliable braking to prevent the cyclist from falling from the bicycle even if sudden braking occurs.

2. Description of the Related Art

A typical bicycle brake includes a pair of braking pieces that are made to be in frictional contact with two sides of a tire rim for achieving the required braking function when desired. It is, however, found that the tire is completely braked and thus affects the steering of the bicycle. In addition, the cyclist may fall from the bicycle when a sudden braking occurs.

The present invention is intended to provide a braking device that mitigates and/or obviates the above problems.

SUMMARY OF THE INVENTION

It is a primary object of the present invention to provide an improved braking device that that provides reliable braking to prevent the cyclist from falling from the bicycle even if sudden braking occurs.

A brake device for a bicycle in accordance with the present invention comprises a mounting seat including a space and an opening that faces a bicycle wheel. A resilient member is mounted in the space. A brake piece is mounted in front of the space for braking the bicycle wheel. The brake piece is connected to the resilient member to move therewith. A connecting member includes a first end operably connected to the resilient member and a second end actuatable by a brake lever for urging the resilient member and the brake piece to brake the bicycle wheel.

In an embodiment of the invention, the mounting seat includes a plurality of positioning holes. The brake piece includes an outer braking face for braking the bicycle wheel and a plurality of first engaging holes defined in an inner face that faces the resilient member. The resilient member includes a plurality of second engaging holes. A corresponding number of pins are provided and each of which is extended through an associated first engaging hole and an associated second engaging hole to connect the brake piece and the resilient member together. Each pin includes a first end with a first necked section for engaging with the associated second engaging hole and a second end with a second necked section. A C-clip is mounted in the second necked section for retaining the pin in place wherein the first end of the pin is extended through an associated positioning hole in the mounting seat.

The resilient member includes a plurality of supporting ribs on an inner side thereof that faces away from the brake piece. Alternatively, the resilient member includes an inner side that faces away the brake piece and an outer side that faces the brake piece, each of the inner side and the outer side of the resilient member including a plurality of supporting ribs on each of two sides thereof.

When the brake lever is operated, the brake piece is moved outward to proceed with the required braking function. The resilient member pushes the brake piece uniformly outward during braking such that braking force is continuously provided to achieve the braking function. This provides a reliable braking function without incurring any potential injury to the cyclist even if the bicycle wheel is suddenly braked. The inner side of the brake piece is in close contact with the outer side of the resilient member while the resilient member is retained in place by the pins to further assure stable braking. In addition, the ribs of the resilient member may be slightly deformed to absorb reactive force from the brake piece during braking. This prevents complete braking of the bicycle wheel and thus allows steering of the bicycle.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
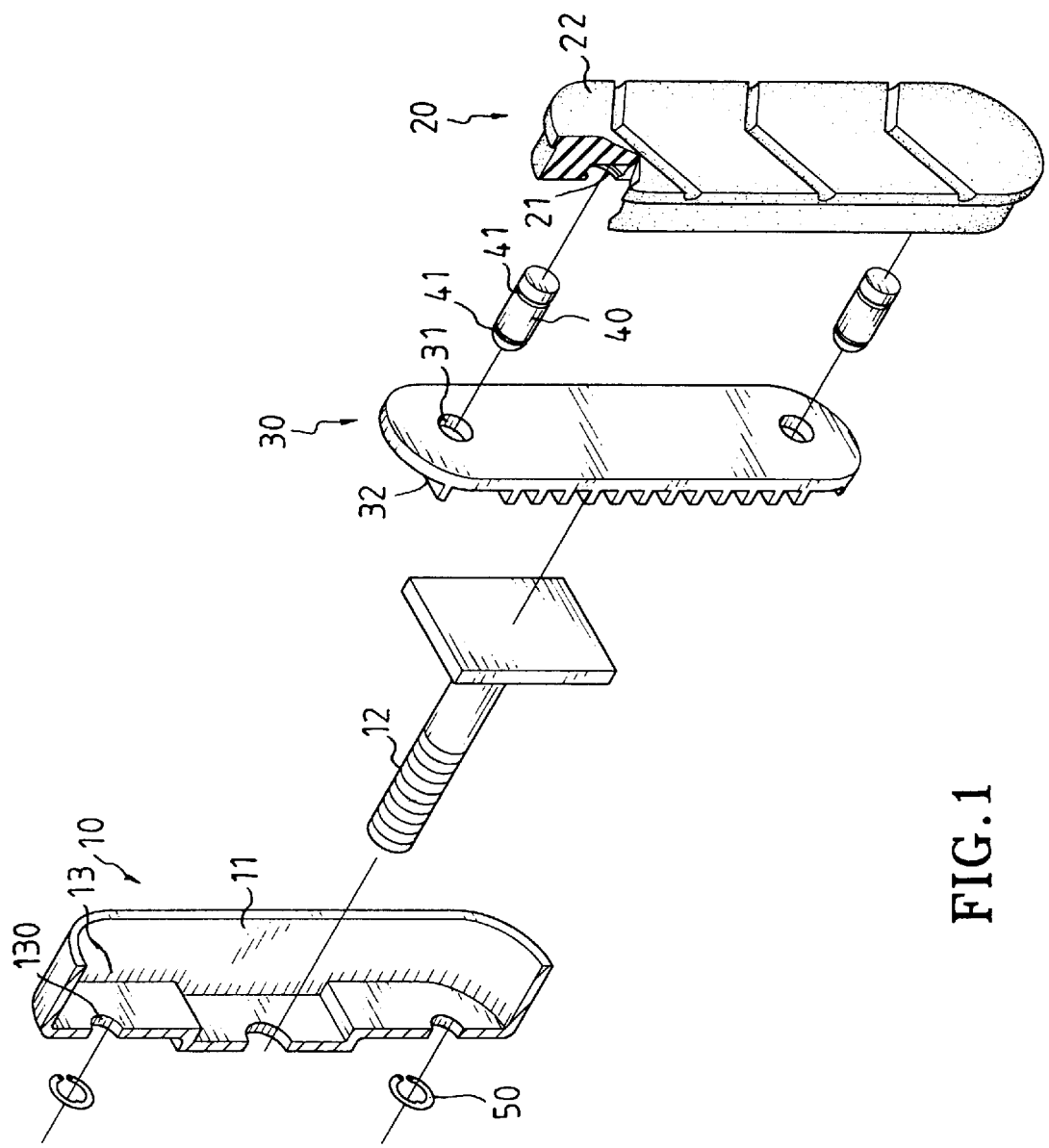
FIG. 1 is an exploded perspective view of a brake device for a bicycle in accordance with the present invention.
Figure 2:
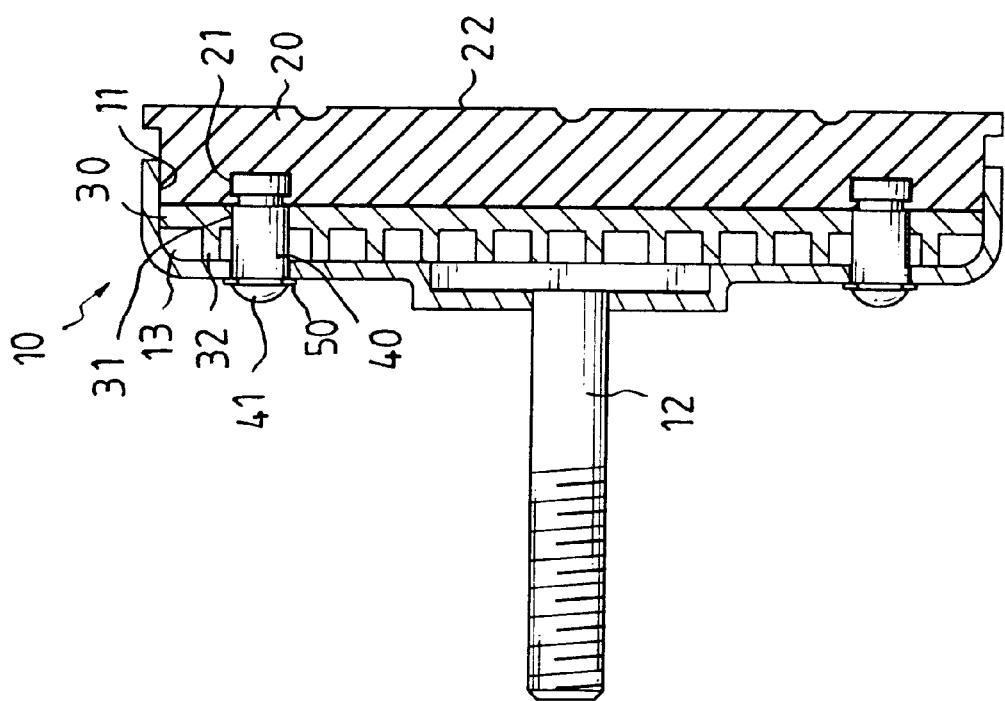
FIG. 2 is a sectional view of the brake device in FIG. 2.

Referring to FIGS. 1 and 2, a brake device in accordance with the present invention generally includes a mounting seat 10 that is secured to a bicycle frame (not shown). The mounting seat 10 includes an opening 11 that faces a bicycle wheel. The mounting seat 10 further includes a buffering space 13 for receiving a resilient member 30 therein. Partially mounted in the mounting seat 10 and in front of the buffering space 13 is a brake piece 20 that can be moved to proceed with the required braking function when desired, which is conventional and therefore not described in detail. A connecting member 12 is extended through the mounting seat 10 and includes a first end operably connected to the resilient member 30 and a second end that is connected with a brake mechanism (not shown) actuatable by a brake lever (not shown).

Figure 3:
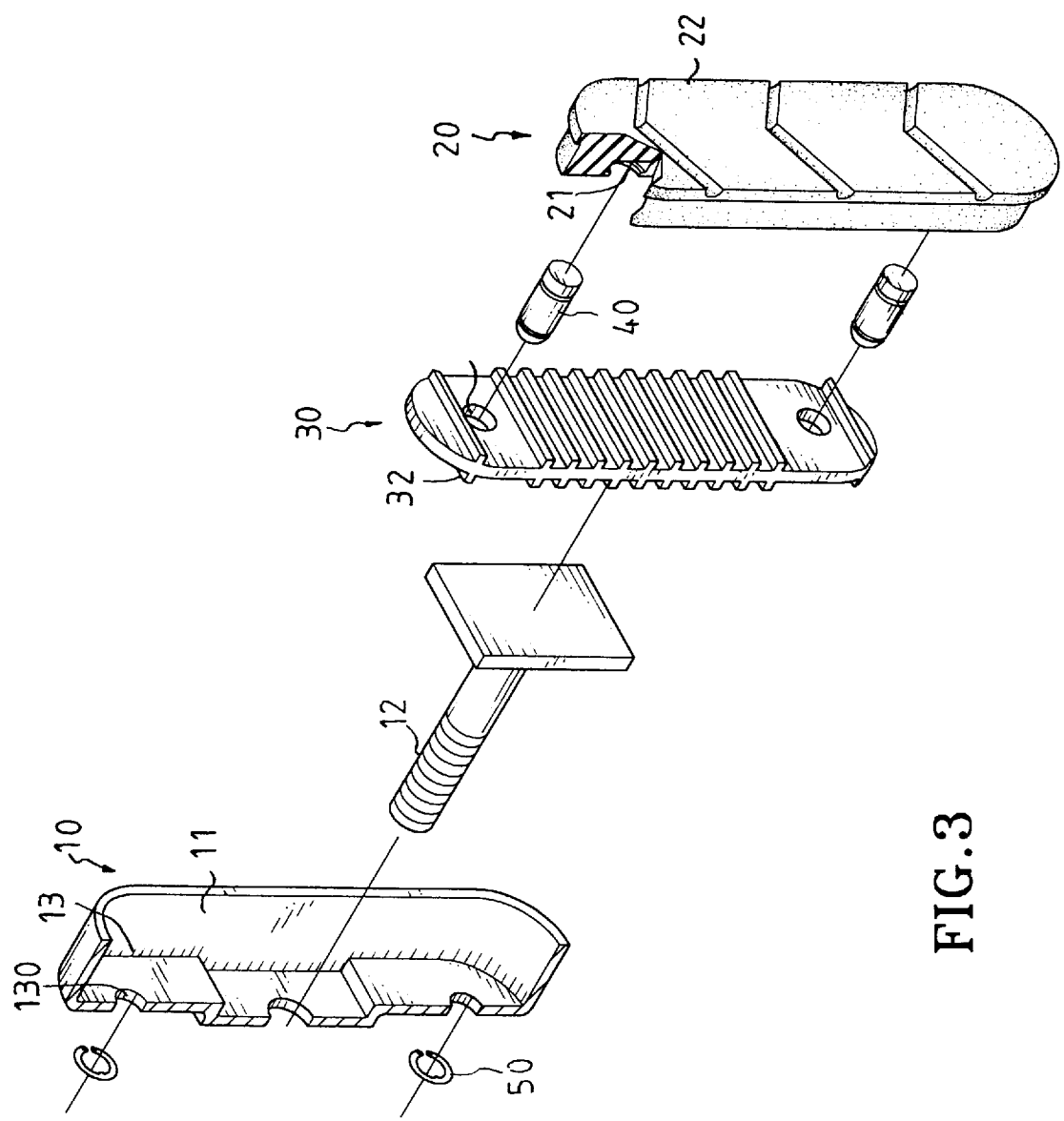
FIG. 3 is an exploded perspective view of a modified embodiment of the brake device in accordance with the present invention.

The brake piece 20 includes an outer braking face 22 and a number of engaging holes 21 defined in an inner face that faces the resilient member 30. The resilient member 30 includes a number of engaging holes 31. A number of pins 40 are extended through the engaging holes 21 and 31 to connect the brake piece 20 and the resilient member 30 together. As can be seen from FIGS. 1 and 2, each pin 40 includes two annular grooves or neck sections 41, wherein the outer neck section 41 engages with an associated engaging hole 21 of the brake piece 20 and wherein the inner neck section 41 has a C-clip 50 mounted therein to retain the pin 40 in place after an end of the pin 40 is extended through an associated positioning hole 130 in the mounting seat 10 (FIG. 2). The resilient member 30 includes a number of supporting ribs 32 on an inner side thereof that faces away from the brake piece 20. In an alternative embodiment of the invention, in addition to the inner side, the outer side of the resilient member 30 also has a number of supporting ribs 32 formed thereon, best shown in FIGS. 3 and 4.

Figure 4:
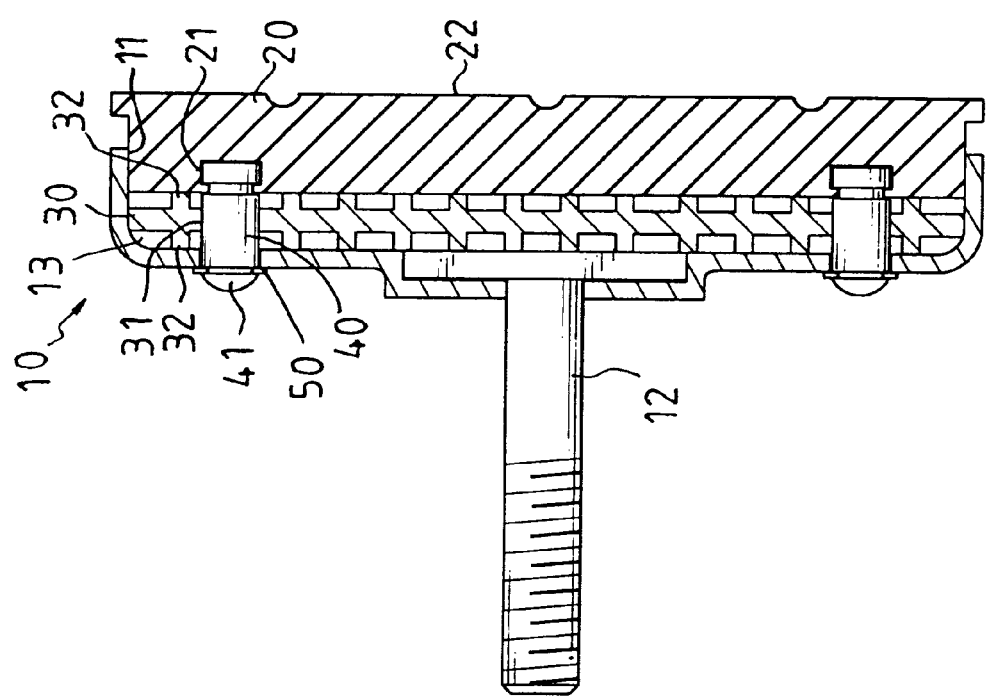
FIG. 4 is a sectional view of the brake device in FIG. 3.

Referring to FIGS. 2 and 4, when the brake lever is operated, the brake piece 20 is moved outward to proceed with the required braking function. The resilient member 30 pushes the brake piece 20 uniformly outward during braking such that braking force is continuously provided to achieve the braking function. This provides a reliable braking function without incurring any potential injury to the cyclist even if the bicycle wheel is suddenly braked. The inner side of the brake piece 20 is in close contact with the outer side of the resilient member 30 while the resilient member 30 is retained in place by the pins 40 to further assure stable braking. In addition, the ribs 32 of the resilient member 30 may be slightly deformed to absorb reactive force from the brake piece 20 during braking. This prevents complete braking of the bicycle wheel and thus allows steering of the bicycle.

Although the invention has been explained in relation to its preferred embodiment, it is to be understood that many other possible modifications and variations can be made without departing from the spirit and scope of the invention as hereinafter claimed.

What is claimed is:

1. A brake device for a bicycle comprising:

a mounting seat including a space and an opening that is adapted to face a bicycle wheel, a resilient member mounted in the space, a brake piece mounted in front of the space for braking the bicycle wheel, the brake piece being connected to the resilient member to move therewith, and a connecting member including a first end operably connected to the resilient member and a second end adapted to be actuated by a brake lever for urging the resilient member and the brake piece to brake the bicycle wheel, the mounting seat including a plurality of positioning holes, the brake piece including an outer braking face for braking the bicycle wheel and a plurality of first engaging holes defined in an inner face that faces the resilient member, the resilient member including a plurality of second engaging holes, and a corresponding number of pins each of which being extended through an associated said first engaging hole and an associated said second engaging hole to connect the brake piece and the resilient member together, each said pin including a first end with a first necked section for engaging with the associated second engaging hole and a second end with a second necked section, a C-clip being mounted in the second necked section for retaining the pin in place wherein the first end of the pin is extended through an associated said positioning hole in the mounting seat.

2. The brake device for a bicycle as claimed in claim 1, wherein the resilient member includes a plurality of supporting ribs on an inner side thereof that faces away from the brake piece.

3. A brake device for a bicycle comprising:

a mounting seat including a space and an opening that is adapted to face a bicycle wheel, a resilient member mounted in the space, a brake piece mounted in front of the space for braking the bicycle wheel, the brake piece being connected to the resilient member to move therewith, and a connecting member including a first end operably connected to the resilient member and a second end adapted to be actuated by a brake lever for urging the resilient member and the brake piece to brake the bicycle wheel, the resilient member including an inner side that faces away from the brake piece and an outer side that faces the brake piece, each of the inner side and the outer side of the resilient member including a plurality of supporting ribs on each of two sides thereof.

4. The brake device for a bicycle as claimed in claim 3, wherein the resilient member includes a plurality of supporting ribs on an inner side thereof that faces away from the brake piece.

\* \* \* \* \*